United States Patent Office 3,326,647
Patented June 20, 1967

3,326,647
ROLLED CARBON STEEL CLAD WITH STAINLESS STEEL
Arnold H. Holtzman, Cherry Hill Township, Camden County, N.J., assignor to E. I. du Pont de Nemours and Company, Wilmington, Del., a corporation of Delaware
No Drawing. Filed Mar. 11, 1966, Ser. No. 533,408
3 Claims. (Cl. 29—183.5)

This application is a continuation-in-part of Ser. No. 213,582 filed July 31, 1962 now abandoned.

The present invention relates to an improved method for rolling steel strip and sheet clad with stainless steel and to a novel product produced by the method.

The preparation of steel sheet or strip clad with corrosion-resistant alloys such as stainless steel can be accomplished in several ways. The chief problems are to obtain a good bond between the backer steel and the stainless steel, to prevent loss of corrosion resistance in stainless steel, and to achieve necessary formability.

One particularly effective method of solving the first problem, that of getting a good bond, is described in Belgian Patent 599,918, which corresponds to U.S. Patent 3,137,937, and which teaches forming a substantially diffusionless metallurgical bond between two or more layers of metals by explosively driving the layers together under conditions wherein a jet of metal is formed by the collision.

This invention presents a stainless steel clad strip or sheet which is particularly low in carbides and other inclusions which lead to poor corrosion resistance and other undesirable properties, and a process for forming slabs of steel clad with stainless steel into such sheet or strip.

The products of this invention are rolled, explosion-bonded clads comprising a carbon steel backer layer having an average carbon content of less than about 0.12% by weight integrally explosion-bonded to at least one layer of austenitic stainless steel, the stainless steel layer having a thickness of less than about 50% of that of the backer layer and containing no more than about 0.03% by weight of carbon to a depth of not less than ⅓, and preferably ⅔ the thickness of the stainless steel layer, the stainless steel layer having a carbon content of less than that of the backer layer. The products of this invention are prepared by reducing the thickness of a stainless steel-on-steel explosion-bonded composite meeting the above carbon criteria by rolling the composite at a temperature above 1550° F., then cooling the rolled composite to below 900° F. within about two hours.

Where it is desired that the clad slab or sheet formed have a thickness of less than 70 mils and particularly if optimum smoothness and appearance of the surface of the steel of the formed clad are desired, the hot-rolled product usually is additionally cold rolled, then annealed and descaled. Thus, schematically the inventive process is as follows:

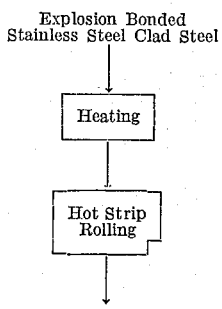

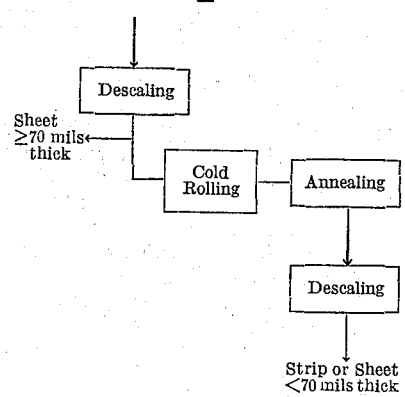

The term "clad slab," as used herein, is intended to define the composite article obtained by explosion cladding processes wherein the stainless steel is the cladding layer and the low carbon steel is the backer layer.

"Rolled" as used herein refers to plastic deformation by rolling, e.g., as in a strip mill, to reduce thickness, e.g. at reduction ratios of up to about 400/1, and usually about 5/1 to 200/1.

The terms "strip" and "sheet," as used herein, are intended to be defined in the normal sense or to have the meaning they normally would have in the metal working area. To this end, the following table taken from "The Making, Shaping and Treating of Steel," Seventh Edition, by United States Steel Company, 1957, is given for purposes of clarification.

| Width (inches) | Thickness (inches) | | | | |
|---|---|---|---|---|---|
| | 0.2300 and thicker | 0.2299 to 0.2031 | 0.2030 to 0.1800 | 0.1799 to 0.0568 | 0.0567 to 0.0449 |
| To 3½ | Bar | Bar | Strip | Strip | Strip |
| 3½ to 6 | Bar | Bar | Strip | Strip | Strip |
| 6–12 | Plate | Strip | Strip | Strip | Strip |
| 12–48 | Plate | Sheet | Sheet | Sheet | Sheet |
| Over 48 | Plate | Plate | Plate | Sheet | Sheet |

One preferred process of the instant invention comprises
(1) heating a clad slab in a soaking furnace to make it pliable,
(2) passing said slab through a strip mill at a temperature above 1550° F.,
(3) cooling said slab to a temperature of less than 900° F. within a period of about two hours,
(4) descaling,
(5) cold rolling, and
(6) annealing at a temperature of from about 1450° F. to about 1750° F. and cooling to below 900° F. within two hours.

The inclusion of steps 5 and 6 are again given the same considerations as were reported above.

If the temperature during hot rolling falls below about 1550° F. or if the sheet or strip is not cooled below about 900° F. in a period of about two hours, carbides precipitate that must be redissolved by annealing at from about 1650° F. to about 1750° F. The use of such an annealing step is meant to be within the scope of the present invention.

Should carbides precipitate, subsequent chemical descaling drastically corrodes the stainless steel surface and leads to an inferior product. Where no chemical descaling is necessary, as when mechanical methods of descaling are used, cold rolling can be performed without annealing. The carbides will then be redissolved by annealing after cold rolling.

Where thicknesses not less than about 70 mils are desired, the cold rolling usually is used merely to improve the smoothness of the surface and cold working usually amounts to about 2% or less. In this case, no further steps are necessary for obtaining the desired product. On the other hand, if the sheet or strip is cold rolled more than 2%, annealing usually is necessary to insure ductility for forming operations which are intended to follow While it is stated that the annealing step, when necessary, be performed at a temperature within the range of from 1450° F. to about 1750° F. a preferred temperature range is from about 1650° F. to about 1750° F. Additionally, if this treatment is carried out in the presence of corrosive gases, such as air, an additional descaling step usually is necessary. If it is carried out in an inert atmosphere such as argon, cracked ammonia, or in a vacuum, no final descaling treatment is necessary.

In practice, the initial stainless cladding layer usually would have a thickness ranging up to about ¼ to ½ in., while the backer steel usually would have a thickness of up to 3 to 7 inches. These clads usually would then be processed to form products in the range of about 20 to 150 mils. In order to make the novel superior product of the present invention, the carbon steel backer layer of the clad sheet or strip must have a carbon content of less than about 0.12% before rolling and the stainless steel cladding layer must be the austenitic type having an average carbon content of less than about 0.03%. The total thickness of stainless steel cladding layer usually is less than about 50%, and preferably less than 25% that of the carbon steel backer. The preferred products of this invention are made from a carbon backer steel with less than 0.06% carbon at its surface. This carbon steel can be rimmed steel with an average carbon content of less than about 0.12%.

The advantage of starting with a carbon content of less than .03% in the stainless steel is to minimize the formation of deleterious carbides which form when austenitic stainless steels are heated into the range of about 900–1550° F. It is well known that a carbide network in austentitic stainless steel reduces corrosion resistance. In addition, it now has been found that steel clad with austenitic stainless steel that contains a precipitated carbide network often shows poor ductility and "pinhole" defects after exposure to a chemical descaling operation. Further it now has been found that if the temperature during hot rolling is below about 1550° F. or the product is held between 900° F. and 1550° F. for an appreciable time deleterious carbides will precipitate even in this low carbon grade of stainless steel. In addition if the rolling temperature is achieved at less than about 1550° F. the stainless steel will not be soft enough to process further without annealing. Because of these factors, hot rolling below 1550° F. and holding the sheet above between about 900° F. and 1550° F. for longer than about 2 hours is avoided. Preferably to reduce diffusion, the total time the clad is held above 900° F. is less than 2 hours. If carbides precipitate, drastic pitting occurs and an inferior product results during subsequent descaling unless redissolved by an annealing step prior to descaling.

The advantage of a backer with low carbon content can be seen from the following table which gives results on the diffusion of carbon from the backer steel into a stainless steel containing 0.025% carbon:

| Temp. (° F.) | Carbon Content of Backer, Percent | Distance of Migration of .03% C layer into the Stainless Steel, mils. after 4 hours |
|---|---|---|
| 2,300 | 0.04 | 48 |
| 2,300 | 0.06 | 118 |
| 2,300 | 0.10 | 166 |
| 2,300 | 0.12 | 182 |
| 2,300 | 0.15 | 192 |
| 2,300 | 0.20 | 212 |

The migration distance is that distance in which carbon content of the stainless steel has been raised above the desired level of .03% because of diffusion from the backer steel into the stainless during the soaking period. Within that distance, carbides will result in this zone even when processed in the preferred manner. These carbides will not impair corrosion resistance since they are internal. However, since some stainless will be removed during descaling and other subsequent operations it is desirable to have the carbide zone less than about ⅔ of the total thickness, and preferably less than ⅓ of the total thickness of the stainless layer. From the above table and taking into account the initial thickness of stainless it is necessary to start with a backer steel with a carbon content of less than about 0.12% and preferably a surface carbon content of less than about 0.06%.

We have found that if the hot rolled product is held between 900 and 1550° F. for an appreciable period significant additional diffusion occurs which extends the carbide zone. For example, if the hot rolled steel were held at 1300° F. for 4 hours an additional carbide affected zone of about 5 mils will result. Since the stainless steel layer is quite thin at this point in the process this additional diffusion is particularly harmful. The effect can be minimized by cooling the hot rolled coil rapidly.

If carbides do form many can be redissolved by heat treatment at 1650°–1750° F. as given in the modified process. Such treatment is particularly effective is redissolving carbides at the surface of the stainless steel, the critical region as regards corrosion resistance.

As indicated hereinbefore, the explosion bonded clad composites used as the starting material in the process of this invention can be prepared by the low velocity explosion-bonding process described in Belgian Patent No. 599,918 and U.S. Patent 3,137,937 which are incorporated herein by reference. This process comprises supporting at least one layer of cladding metal parallel to the surface of a layer of metal to be clad, the inside surface of the layer of cladding metal being spaced from the surface of said metal to be clad, placing a layer of detonating explosive on the outer surface of the cladding layer or layers, the detonating explosive having a low velocity of detonation, preferably less than 100% of the velocity of sound in that metal in the system having the highest sonic velocity (less than about 4500 to 4800 m./sec.), and thereafter initiating the explosive so that the detonation is propagated parallel to the metallic layers. The spacing, or standoff, between any two layers to be clad must be at least about 0.001 inch. Depending on the particular metal layer used, greater separations can be used; however, in general, separation of more than 0.5 inch is not convenient or necessary. Usually standoff varies from about 0.3 to 0.7 of the cladder layer thickness. The loading of the detonating explosive varies with the particular metals being clad and the standoff therebetween. In general, conventional low velocity explosives at loadings of about 2 grams/in.² to 50 grams/in.² can be used. The explosion bonding process of Belgian Patent 633,913 which corresponds to U.S. Ser. No. 264,373, filed Mar. 11, 1963, now U.S. Patent No. 3,264,731, and a continuation-in-part of U.S. Ser. No. 118,376, filed June 20, 1961, which are incorporated herein by reference, also can be used to prepare the explosion-bonded starting materials of this invention.

The explosive cladding process carried out as described above yields composites which can be processed directly in accordance with this invention and the composites need not be subjected to drastic straightening or other forming operations prior to rolling. In the process of this invention it is preferred to use clads prepared as described above in which the bond zone contains little solidified melt and such melt is present in discrete, relatively periodic regions or pockets of homogeneous alloy separated by substantially continuous direct metal-to-metal bonding. In general, such preferred bond zones are favored by using lower detonation velocity explosives and, hence, lower collision velocities, as well as greater standoff in the low velocity cladding process of U.S. Patent 3,137,937. Although the process of this invention is described primarily with reference to two-layered clads, clads of three or more layers of stainless-on-steel can be used. For example, composites of austenitic stainless steel explosion bonded to each side of a carbon steel backer layer, each layer meeting the aforementioned carbon criteria, are eminently suited for processing in accordance with this invention to yield cookware stock.

The stainless steels usable in this invention are known as the austenitic stainless steels and are not hardenable by heat treatment. The compositions contain as major constituents from about 16 to 26% chromium, from about 6–22% nickel, most of the remainder being iron.

Other elements present include up to 2% manganese for all grades and 2 to 4% molybdenum in some grades, small quantities of titanium and columbium in some grades and small amounts of carbon, sulfur, phosphorus and silicon in all grades. Typical grades suitable for the practice of the present invention are known in the art as 304L, 316L and 347L.

These grades consist essentially of iron and, in percent by weight, the following:

|  | Type 304L | Type 316L | Type 347L |
| --- | --- | --- | --- |
| Chromium | 18.00–20.00 | 16.00–18.00 | 17.00–19.00. |
| Nickel | 8.00–12.00 | 10.00–14.00 | 9.00–13.00. |
| Manganese | 2.00, max | 2.00, max | 2.00, max. |
| Silicon | 1.00, max | 1.00, max | 1.00, max. |
| Carbon | 0.03, max | 0.03, max | 0.03, max. |
| Phosphorus | 0.045, max | 0.045, max | 0.045, max. |
| Sulfur | 0.03, max | 0.03, max | 0.03, max. |
| Columbium-tantalum |  |  | 10×C min. |

The backer steel is a carbon steel which ordinarily contains more than 98.5% iron with a maximum of 0.04% phosphorus, 0.05% sulfur, and 0.1% silicon, 0.25 to 0.9% manganese, and an average carbon content less than about 0.12%.

The preferred backer steels used for this invention are those having a low carbon content on the surface. For example, rimmed steel having an average carbon content of less than 0.12 and a surface carbon content of about 0.06% or less and killed or semikilled steel having an average carbon content of about 0.06% or less are suitable. Killed steel also has reduced grain growth propensity which is favorable for making the product of the present invention.

Classification of carbon steels as killed, semikilled and rimmed is governed by the extent of deoxidation treatment given them. Rimmed steel is only partially deoxidized with the intent that some gas will be liberated on cooling. These escaping gases clean the surface crystals of the solidifying ingot. Thus rimmed steel will have a lower carbon content on the surface than in the center.

The first step in the thickness reduction of stainless-steel clad steel slabs is to preheat them to soften them for size reduction in a hot strip mill. This heating is done in a conventional soaking furnace. From this furnace the clad steel plate goes to a hot strip mill where rolling reduces its thickness, usually to about 0.09 inch. Hot strip mills are well known in the art and generally consist of the following elements:

(1) a roughing scale breaker which loosens the surface scale on the plate to be subsequently removed by high pressure hydraulic sprays
(2) several roughing stands where the plate is passed through rolls for the preliminary thickness reduction
(3) a finishing scale breaker
(4) several finishing stands where the final hot thickness reduction is accomplished
(5) coiler The sheet from the hot strip mill has a poor surface because of oxidation at the high temperatures of the rolling operation and before cold rolling the surface is chemically descaled by treatment with a descaling agent. This descaling agent can be selected from one of the following or from other conventional descaling agents.

(1) aqueous 10% nitric acid containing about 4% hydrofluoric acid
(2) an aqueous sulfuric acid or aqueous nitric acid electrolytic pickling bath
(3) molten salt pickling bath
(4) sodium hydride pickling bath.

Mechanical descaling methods such as grit, shot, or sand blasting can also be employed.

Because the backer steel is more rapidly attacked than the stainless steel clad to it by acidic baths, careful control of the pickling time must be observed when acidic pickling baths are used.

The sodium hydride descaling process consists of immersing the metal to be descaled in a bath of molten caustic soda operated at 700° F. which contains 1.5 to 2% sodium hydride produced in place by reacting sodium and hydrogen. The sodium hydride reduces the metal oxide scale to metal or lower oxides which can be removed by a water quench. The sodium hydride descaling is preferred for the process of the present invention because of the fact that it attacks neither carbon steel or stainless steel appreciably whereas acidic descaling processes must be carefully controlled to prevent excessive attack on the carbon steel.

Acidic descaling processes can be used without damage if the carbon steel is protected during the descaling of the stainless steel. For example, aqueous sulfuric acid at 150° F. can be used to descale the carbon steel. The carbon steel can then be covered with tape or other suitable covering material and the stainless steel descaled by an aqueous solution of 15% nitric acid and 2% hydrofluoric acid.

The hot rolling process can also be carried out by a conventional method of the steel industry called sandwich rolling. In this procedure, two pieces of the clad steel are rolled in a sandwich, with either the carbon steel layer of one sheet facing the carbon steel layer of the other sheet or the stainless steel layer of one sheet facing the stainless steel layer of the other sheet. When this technique is used the faces of the two sheets of the sandwich which were together and protected from the atmosphere do not need appreciable descaling although it is still necessary to descale the oxidized outer surfaces.

If further reduction in the thickness of the strip or sheet is desired, the clad sheet usually is then sent to a cold rolling mill where the sheet is reduced to its final thickness. This cold rolling mill can be, e.g., either a reversing mill or a tandem mill. A reversing mill, as the name indicates, runs the sheet back and forth through a single set or a plurality of rolls whereas the tandem mill consists of several sets of rolls in series through which the sheet or strip passes. The tandem mills are preferred where appreciable reduction in thickness is required because of a faster throughput of steel. Where small reduction is required to improve surface appearance a reversing mill usually is used.

Cold rolling is employed to give thinner gages of metal than hot working can accomplish economically and to produce a better surface. Although in cold rolling the metal is cold when the rolling is started the rolling action generates heat so that the temperature can be at about 400° F. to about 800° F. by the end of the process. The overall effect of cold rolling is to decrease the thickness, increase the strength and hardness, and to decrease the ductility of the product.

In the process of the present invention the stainless steel-carbon steel clad can be cold rolled to a much greater degree than can an equivalent thickness of conventional stainless steel because the carbon steel does not work harden nearly so much as stainless steel and the clad article is mostly carbon steel.

Following the cold rolling the ductility of the metal is usually restored by an annealing operation heat treatment between about 1450° F. and 1750° F. The final annealing temperature is preferably selected on the basis of grain growth propensity of the backer steel. For example, if a rimmed steel is used a temperature of 1750° F. causes extensive grain growth and the phenomen of "orange peel" occurs on subsequent fabrication. "Orange peel" is undesirable because it becomes necessary to remove some of the stainless steel by polishing. Thus for rimmed steel a temperature of less than about 1650° F. is used for annealing. If killed steel is used for the backer temperatures up to about 1750° F. can be used without causing excessive grain growth. Temperatures less than 1450° F. do not give satisfactory softening and those above 1750° F. usually give excessive scaling and grain growth. The clad steel is heated at the above temperature ranges for about 5 minutes and is then cooled to below 900° F. within less than about 2 hours to prevent deleterious carbide precipitation.

Present day practice in rolling austenitic stainless steel or strip involves the following steps:

(1) Passing the slab through a hot strip mill to reduce the thickness to about 100 mils.

(2) Annealing at about 1950° F. cooling rapidly after heat treatment.

(3) Descaling with nitric acid-hydrofluoric acid mixtures of sodium hydride.

(4) Cold rolling to an intermediate thickness in a reversing mill.

(5) Annealing at about 1950° F.

(6) Descaling as in Step 3.

(7) Cold rolling to final gage in a reversing mill.

(8) Final annealing at about 1950° F.

The process of the present invention considerably shortens the above procedure. For sheets thicker than about 70 mils where surface condition is not critical all steps except 1 and 3 are eliminated. For thinner sheets where the stainless steel layer contains less than 0.03% carbon and the carbon steel layer has a surface carbon content of less than about 0.06% only steps 1, 3, 4, and 5 are necessary, with the annealing temperature in step 5 being between 1450° F. and 1750° F. and preferably about 1650° F. Indeed, heat treatment at 1950° F. would have an adverse effect upon a clad product because of deleterious effects on the backer steel such as excessive grain growth.

In addition, in the process of the prior art stainless steel is cold rolled through a reversing mill. A reversing mill makes the process a low speed one as compared to processes involving the tandem mills used in carbon steel cold rolling and which could be used for the cold rolling step of the present invention.

The following example describes the present invention in a more detailed manner. Compositions, where given, are by weight.

*Example 1*

A sample of carbon steel (500 mils thick) having 0.035% carbon is explosively clad with a covering of stainless steel, type 304L, 50 mils thick having less than 0.03% carbon, by the process disclosed in the copending U.S. Patent 3,137,937 described above. This clad slab is heated at 2200° F. in a furnace for 1 hour. It is then hot rolled to 159 mils with the temperature being above 1550° F. After cooling to less than 900° F. within 1 hour the carbon steel portion of the sheet is descaled by treating it in 10% sulfuric acid at 150° F. for 30 minutes. After washing off the descaling liquid the carbon steel side of the slab is protected with a coating of vinyl tape and the stainless steel side of the slab is descaled by immersing in an aqueous solution containing 15% nitric acid and 2% hydrofluoric acid at 150° F. for 10 minutes. After washing off the descaling liquid the slab is cold rolled to 42 mils. The sheet is then annealed at 1650° F. for 5 minutes.

The sheet is descaled again by the process described above.

The properties of the clad sheet are as follows:

(1) The stainless steel side of the clad has a carbon content of less than 0.03% to a depth of at least about ⅔ its thickness.

(2) The stainless steel side of the clad sheet shows no pitting after exposure to a salt spray for 100 hours.

(3) The sheet can be bent on a circle the radius of which is 1, 2, and 4 times its thickness without cracking.

(4) In the Olsen cup test, which involves punching the specimen with a ¾ inch indentation to determine the height of cup obtainable without cracking, this sample forms a cup 10.2 mm. high before cracking appears.

The above procedure is repeated exactly as above with the exeception that the sheet is descaled in a molten sodium hydroxide bath containing 2% sodium hydride at 700° F. followed by a short acid dip in a 10% HNO₃, 1% HF mixture for 20 minutes.

*Example 2*

A sample of carbon steel 500 mils thick having .10% carbon is explosively clad with a covering of stainless steel, type 304L, 50 mils thick. This clad slab is heated at 2200° F. in a furnace for 1 hour. It is then hot rolled to 100 mils at a temperature above 1550° F. After cooling to less than 900° F. within one hour the sheet is descaled by the method used in Example 1. This steel sheet can be bent over a mandrel 100 mils in radius without cracking or separation of layers. Such sheet is suitable for forming into automobile bumper stock, for example. The clad sheet obtained is similar in properties to that obtained above.

The process of this example can also be carried out with similar results when a 50-mil type 304L stainless cladder layer is explosion bonded to both sides of the backer layer before rolling.

The invention has been described in the foregoing disclosure. Many other modifications will be apparent to those skilled in the art without departing from the inventive concept.

I claim:

1. A rolled, explosion-bonded clad comprising a plain carbon steel backer layer having an average carbon content of less than about 0.12% integrally explosion-bonded to at least one layer of austenitic stainless steel, said stainless steel layer being of austenitic stainless steel consisting essentially of iron, about from 16 to 26% by weight chromium, about from 6 to 22% by weight nickel, 0 to about 2% by weight manganese, 0 to about 4% by weight molybdenum, carbon in an amount less than about 0.03% by weight to a depth of not less than ⅓ the thickness of said stainless steel layer measured from the outer surface thereof and less than the carbon content of said backer layer, and additional minor alloying elements selected from the group consisting of titanium, tantalum, columbium, sulfur, phosphorus, and silicon.

2. A clad of claim 1 selected from the group consisting of sheet and strip wherein said stainless steel has a carbon content less than about 0.03% to a depth of not less than ⅔ the thickness of the stainless steel layer and the backer layer consists essentially of, by weight, greater than 98.5% iron, up to about 0.04% phosphorus, up to about 0.05% sulfur, up to about 0.1% silicon, up to about 0.9% manganese and an average of less than about 0.06% carbon.

3. A clad of claim 2 wherein said stainless steel consists essentially of iron and the following by weight:

| | Percent |
|---|---|
| Chromium | 18–20 |
| Nickel | 8–12 |
| Manganese | maximum 2 |
| Silicon | do 1 |
| Phosphorus | do 0.05 |
| Sulfur | do 0.03 | and less than 0.03% carbon to a depth of not less than ⅓ the thickness of said stainless steel layer measured from the outer surface thereof.

References Cited

UNITED STATES PATENTS

| 1,972,667 | 9/1934 | Schittler | 29—196.1 X |
| 2,653,117 | 9/1953 | Keene | 29—196.1 X |
| 3,171,738 | 3/1965 | Renshaw | 75—128 |
| 3,233,312 | 2/1966 | Cowan | 29—198 X |

HYLAND BIZOT, *Primary Examiner.*